US011356552B2

(12) United States Patent
Rist et al.

(10) Patent No.: US 11,356,552 B2
(45) Date of Patent: *Jun. 7, 2022

(54) INTEGRATING A COMMUNICATION TERMINAL AS THE PREFERRED DEVICE IN A STATIC COMMUNICATION SYSTEM CONFIGURATION

(71) Applicant: Unify Patente GmbH & Co. KG, Munich (DE)

(72) Inventors: Claus Rist, Bochum (DE); Juergen Schwartze, Schwerte (DE); Ralf Neuhaus, Luenen (DE)

(73) Assignee: Unify Patente GmbH & Co. KG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/918,376

(22) Filed: Jul. 1, 2020

(65) Prior Publication Data
US 2020/0336587 A1 Oct. 22, 2020

Related U.S. Application Data

(63) Continuation of application No. 16/452,765, filed on Jun. 26, 2019, now Pat. No. 10,750,012, which is a
(Continued)

(30) Foreign Application Priority Data

May 30, 2016 (DE) .......................... 102016109938.4

(51) Int. Cl.
H04M 3/42 (2006.01)
H04M 3/54 (2006.01)
(Continued)

(52) U.S. Cl.
CPC ........ *H04M 3/42263* (2013.01); *H04L 51/36* (2013.01); *H04M 3/42272* (2013.01);
(Continued)

(58) Field of Classification Search
CPC .... H04L 51/36; H04L 41/08; H04M 2242/16; H04M 3/42153; H04M 3/42163;
(Continued)

(56) References Cited

U.S. PATENT DOCUMENTS 5,870,464 A * 2/1999 Brewster ................. H04M 3/51
719/317
6,594,357 B1 7/2003 Emerson et al.
(Continued)

FOREIGN PATENT DOCUMENTS

CN 101278546 A 10/2008
DE 202011003225 U1 6/2011

OTHER PUBLICATIONS

Unify Deutschland: "One Number Service", Youtube, Dec. 3, 2015, Seite 1 pp., XP054980353; URL:https://www.youtube.com/watch?v=KTTNIU21Tvg [gefunden am Mar. 31, 2020].
(Continued)

*Primary Examiner* — Syed Ali
*Assistant Examiner* — Jason A Harley
(74) *Attorney, Agent, or Firm* — Buchanan Ingersoll & Rooney PC

(57) ABSTRACT

A computer-implemented method is disclosed for integrating at least one first communication terminal assigned to a user as a preferred device in a static configuration of a communication system and/or for dynamically switching from a first communication terminal used as a preferred device to a second communication terminal as a preferred device for providing a one-number service using the preferred device, to which a one-number service number is
(Continued)

assigned, wherein at least two communication terminals are statically assigned to the user and a preferred device is also dynamically assigned to the user through a virtual device. Also disclosed is communication system designed for this purpose.

4 Claims, 15 Drawing Sheets

Related U.S. Application Data continuation of application No. 15/607,862, filed on May 30, 2017, now Pat. No. 10,382,622.

(51) Int. Cl.
    *H04W 8/26*     (2009.01)
    *H04W 4/00*     (2018.01)
    *H04Q 3/00*     (2006.01)
    *H04J 3/14*     (2006.01)
    *H04M 3/487*     (2006.01)
    *H04L 51/56*     (2022.01)
    *H04M 7/00*     (2006.01)

(52) U.S. Cl.
    CPC ...... *H04M 3/42153* (2013.01); *H04M 7/0033* (2013.01); *H04M 2242/16* (2013.01)

(58) Field of Classification Search
    CPC ... H04M 3/42272; H04M 3/58; H04W 88/06; H04W 8/186; G06F 2201/815
    USPC .......................................... 718/1; 379/88.21
    See application file for complete search history.

(56) References Cited

U.S. PATENT DOCUMENTS

| | | | |
|---|---|---|---|
| 2002/0001300 A1* | 1/2002 | Miloslavsky | H04M 3/5237 370/352 |
| 2006/0177030 A1 | 8/2006 | Rajagopalan et al. | |
| 2007/0073882 A1 | 3/2007 | Brown et al. | |
| 2007/0281717 A1* | 12/2007 | Bharadwaj | H04L 12/189 455/466 |
| 2009/0089407 A1 | 4/2009 | Chalupa et al. | |
| 2010/0029250 A1 | 2/2010 | Gupta | |
| 2010/0115084 A1* | 5/2010 | Caspi | G06F 1/3203 709/224 |
| 2012/0151481 A1 | 6/2012 | Kang et al. | |
| 2014/0250318 A1* | 9/2014 | Upadhye | H04M 3/00 714/4.11 |
| 2016/0088155 A1* | 3/2016 | Patel | H04M 3/5166 379/265.09 |
| 2016/0155163 A1* | 6/2016 | White | G06Q 30/0611 705/26.2 |
| 2016/0295454 A1* | 10/2016 | Kim | H04B 7/0456 |
| 2017/0104713 A1* | 4/2017 | Agarwal | H04L 61/605 |
| 2017/0177528 A1* | 6/2017 | Harriman | G06F 13/4282 |
| 2017/0272270 A1* | 9/2017 | Gu | H04W 4/80 |
| 2017/0346944 A1* | 11/2017 | Rist | H04M 3/42263 |
| 2017/0371708 A1 | 12/2017 | Pai | |

OTHER PUBLICATIONS

Unify Software and Solutions GmbH & Co. KG: "ONS—Experts Wiki", Apr. 5, 2016, XP055681238; Gefunden im Internet: URL:https:/wiki.unify.com/wiki/ONS [gefunden am Mar. 31, 2020].

\* cited by examiner

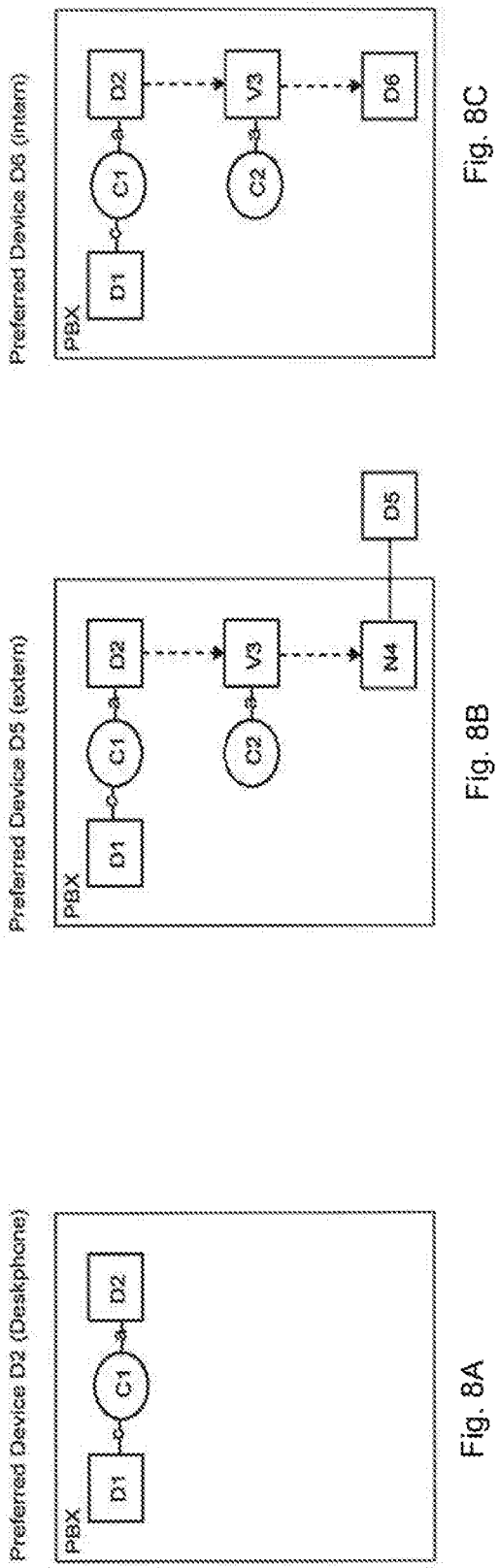

| Activity | MONITORED DEVICE D1 | MONITORED DEVICE D2 | Comments |
|---|---|---|---|
| User 2 activates desk phone device D2 as Preferred Device | | SetForwardingRequest<br>• device<br>• forwardingType<br>• activateForwarding<br>• forwardDN | D2<br>forwardImmediate<br>True<br>tel:D2>PreferredDevice | forwardingType forwardImmediate is here as an example in connection with the existing ECMA definitions, other applicable definitions such as preferredDevice are freely selectable |
| User 1 calls User 2 | DeliveredEvent<br>• connection<br>• alertingDevice<br>• callingDevice<br>• calledDevice<br>• lastRedirectionDevice<br>• localConnectionInfo<br>• cause | C3C1<br>C3BD2<br>D1<br>D2<br>NR<br>Connected<br>newCall | DeliveredEvent<br>• connection<br>• alertingDevice<br>• callingDevice<br>• calledDevice<br>• lastRedirectionDevice<br>• localConnectionInfo<br>• cause | C3C1<br>C3BD2<br>D1<br>D2<br>NR<br>Alerting<br>newCall | UC ONS application reflects the dynamic link of the C1 connection. |
| User 2 activates external device D5 as Preferred Device | | SetForwardingRequest<br>• device<br>• forwardingType<br>• activateForwarding<br>• forwardDN | D2<br>forwardImmediate<br>True<br>tel:D5>PreferredDevice | forwardingType forwardImmediate here is an example in connection with the existing ECMA definitions, other applicable definitions such as preferredDevice are freely selectable |
| User 1 calls User 2 | DeliveredEvent<br>• connection<br>• alertingDevice<br>• callingDevice<br>• calledDevice<br>• lastRedirectionDevice<br>• localConnectionInfo<br>• cause | C3C1<br>C3BD5<br>D1<br>D2<br>NR<br>Connected<br>newCall | DeliveredEvent<br>• connection<br>• alertingDevice<br>• callingDevice<br>• calledDevice<br>• lastRedirectionDevice<br>• localConnectionInfo<br>• cause | C3C1<br>C3BD5<br>D1<br>D2<br>NR<br>Alerting<br>newCall | UC ONS application reflects the dynamic link of the C1 connection. |
| User 2 activates internal device D6 as Preferred Device | | SetForwardingRequest<br>• device<br>• forwardingType<br>• activateForwarding<br>• forwardDN | D2<br>forwardImmediate<br>True<br>tel:D6>PreferredDevice | forwardingType forwardImmediate here is an example in connection with the existing ECMA definitions, other applicable definitions such as preferredDevice are freely selectable |
| User 1 calls User 2 | DeliveredEvent<br>• connection<br>• alertingDevice<br>• callingDevice<br>• calledDevice<br>• lastRedirectionDevice<br>• localConnectionInfo<br>• cause | C3C1<br>C3BD6<br>D1<br>D2<br>NR<br>Connected<br>newCall | DeliveredEvent<br>• connection<br>• alertingDevice<br>• callingDevice<br>• calledDevice<br>• lastRedirectionDevice<br>• localConnectionInfo<br>• cause | C3C1<br>C3BD6<br>D1<br>D2<br>NR<br>Alerting<br>newCall | UC ONS application reflects the dynamic link of the C1 connection. |

Fig. 9A

| Activity | MONITORED DEVICE D1 | | MONITORED DEVICE D2 oder V3 | | MONITORED DEVICE N4 oder D5 | | Comments |
|---|---|---|---|---|---|---|---|
| User 1 calls User 2 (Preferred Device is desk phone Device D2) | DeliveredEvent<br>• connection<br>• alertingDevice<br>• callingDevice<br>• calledDevice<br>• lastRedirectionDevice<br>• localConnectionInfo<br>• cause | D2C1<br>D2<br>D1<br>D2<br>NR<br>Connected<br>newCall | DeliveredEvent<br>• connection<br>• alertingDevice<br>• callingDevice<br>• calledDevice<br>• lastRedirectionDevice<br>• localConnectionInfo<br>• cause | D2C1<br>D2<br>D1<br>D2<br>NR<br>Alerting<br>newCall | | | CSTA application reflects the desktop device |
| User 1 calls User 2 (Preferred Device is desk phone Device D5) | DeliveredEvent<br>• connection<br>• alertingDevice<br>• callingDevice<br>• calledDevice<br>• lastRedirectionDevice<br>• localConnectionInfo<br>• cause | V3C1<br>V3<br>D1<br>D2<br>NR<br>Connected<br>newCall | DeliveredEvent<br>• connection<br>• alertingDevice<br>• callingDevice<br>• calledDevice<br>• lastRedirectionDevice<br>• localConnectionInfo<br>• cause | V3C1<br>V3<br>D1<br>D2<br>NR<br>Alerting<br>newCall | DeliveredEvent<br>• connection<br>• alertingDevice<br>• callingDevice<br>• calledDevice<br>• lastRedirectionDevice<br>• assocCalledDevice<br>• localConnectionInfo<br>• cause | N4C2<br>D5<br>D1<br>D2 or D5<br>NR<br>N4<br>Connected<br>newCall | CSTA application reflects the virtual device |
| User 1 calls User 2 (Preferred Device is desk phone Device D6) | DeliveredEvent<br>• connection<br>• alertingDevice<br>• callingDevice<br>• calledDevice<br>• lastRedirectionDevice<br>• localConnectionInfo<br>• cause | V3C1<br>V3<br>D1<br>D2<br>NR<br>Connected<br>newCall | DeliveredEvent<br>• connection<br>• alertingDevice<br>• callingDevice<br>• calledDevice<br>• lastRedirectionDevice<br>• localConnectionInfo<br>• cause | V3C1<br>V3<br>D1<br>D2<br>NR<br>Alerting<br>newCall | DeliveredEvent<br>• connection<br>• alertingDevice<br>• callingDevice<br>• calledDevice<br>• lastRedirectionDevice<br>• assocCalledDevice<br>• localConnectionInfo<br>• cause | D6C2<br>D6<br>D1<br>D2 or D6<br>NR<br>Connected<br>newCall | CSTA application reflects the virtual device |

Fig. 9B

| Activity | MONITORED DEVICE D1 | MONITORED DEVICE D2 | | Comments |
|---|---|---|---|---|
| User 2 activates desk phone D2 as Preferred Device | | SetAgentState<br>• device<br>• requestedAgentState<br>• group | D2<br>loggedOn/notReady<br>D2 | requestedAgentState here is an example in connection with the existing ECMA definitions, such as loggedOn/loggedOff/ready/notReady, other applicable definitions are freely selectable. |
| User D1 calls User 2 | DeliveredEvent<br>• connection<br>• alertingDevice<br>• callingDevice<br>• calledDevice<br>• lastRedirectionDevice<br>• localConnectionInfo<br>• cause | D2C1<br>D2/D2<br>D1<br>D2<br>NR<br>Connected<br>newCall | DeliveredEvent<br>• connection<br>• alertingDevice<br>• callingDevice<br>• calledDevice<br>• lastRedirectionDevice<br>• localConnectionInfo<br>• cause | D2C1<br>D2/D2<br>D1<br>D2<br>NR<br>Alerting<br>newCall | UC ONS application reflects the dynamic link of the C1 connection. Occurrences (Events) can be referenced to the virtual device V3. |
| User 2 activates external device D5 as Preferred Device | | SetAgentState<br>• device<br>• requestedAgentState<br>• group | D5<br>loggedOn/loggedOff<br>D2 | requestedAgentState here is an example in connection with the existing ECMA definitions, such as loggedOn/loggedOff/ready/notReady, other applicable definitions are freely selectable. |
| User 1 calls User 2 | DeliveredEvent<br>• connection<br>• alertingDevice<br>• callingDevice<br>• calledDevice<br>• lastRedirectionDevice<br>• localConnectionInfo<br>• cause | D2C1<br>D2/D5<br>D1<br>D2<br>NR<br>Connected<br>newCall | DeliveredEvent<br>• connection<br>• alertingDevice<br>• callingDevice<br>• calledDevice<br>• lastRedirectionDevice<br>• localConnectionInfo<br>• cause | D2C1<br>D2/D5<br>D1<br>D2<br>NR<br>Alerting<br>newCall | UC ONS application reflects the dynamic link of the C1 connection. Occurrences (Events) can be referenced to the virtual device V3. |
| User 2 activates internal device D6 as Preferred Device | | SetAgentState<br>• device<br>• requestedAgentState<br>• group | D6<br>loggedOn/loggedOff<br>D2 | requestedAgentState here is an example in connection with the existing ECMA definitions, such as loggedOn/loggedOff/ready/notReady, other applicable definitions are freely selectable. |
| User 1 calls User 2 | DeliveredEvent<br>• connection<br>• alertingDevice<br>• callingDevice<br>• calledDevice<br>• lastRedirectionDevice<br>• localConnectionInfo<br>• cause | D2C1<br>D2/D6<br>D1<br>D2<br>NR<br>Connected<br>newCall | DeliveredEvent<br>• connection<br>• alertingDevice<br>• callingDevice<br>• calledDevice<br>• lastRedirectionDevice<br>• localConnectionInfo<br>• cause | D2C1<br>D2/D6<br>D1<br>D2<br>NR<br>Alerting<br>newCall | UC ONS application reflects the dynamic link of the C1 connection. Occurrences (Events) can be referenced to the virtual device V3. |

INTEGRATING A COMMUNICATION TERMINAL AS THE PREFERRED DEVICE IN A STATIC COMMUNICATION SYSTEM CONFIGURATION

CROSS REFERENCE TO RELATED APPLICATIONS

This application is a continuation application of U.S. patent application Ser. No. 16/452,765, which is a continuation of U.S. patent application Ser. No. 15/607,862, which claims priority to German Patent Application No. DE 102016109938.4, filed on May 30, 2016.

FIELD OF INVENTION

This invention concerns a method for integrating a communication terminal as the preferred device in a static configuration, a computer program product for implementing the method, a machine-readable data carrier with the computer program product stored on it, and a corresponding communication system.

BACKGROUND OF THE INVENTION

The following terms are briefly defined here for use in the following description:

A telecommunication platform (also called a TC platform) is a switching center or telecommunications installation, for example (also called a PBX or "Private Branch Exchange"). Such TC platforms offer mostly SIP-based VoIP/Video-over-IP technologies. A telephone terminal is, for example, a telephone, smartphone, computer used to establish or operate a telephone connection ("call") or a data connection, or another—possibly virtual—type of terminal.

A cloud communication server (CCS) is, for example, a SaaS Cloud platform for collaborative cross-team work. It allows teams to receive what they need for effective communication in a single client (also called a CCS client).

A CCS client is, for example, an application software (app) that combines voice, video, screen sharing, messaging, chat, file sharing, etc., making collaborative work easy and trouble-free. Such a CCS client on a cloud communication server is based primarily on WebRTC technology and can be installed on a (telephone) terminal, for example.

The following abbreviations are explained below:
  API: Application Programming Interface
  App: Application, Application software or environment, Software, Web application
  ATC: Advanced Telephony Connector
  CSTA: Computer Supported Telecommunications Applications (ECMA)
  CTI: Computer Telephony Integration (e.g., CSTA, TAPI)
  ECMA: Ecma International Standardization Board
  ONS: One-Number Service (in an internal/external company network)
  PBX: Telecommunication installation, Telecommunication platform, Switch
  PD: Preferred (communication terminal) Device
  SIP: Session Initiation Protocol
  TAPI: Telephony Applications Interface (Microsoft)
  UC: Unified Communication
  WebRTC: Web Real-Time Communication With One-Number Service, a user can be located anywhere. The user can always be reached at the one telephone number that the user has given to other people. With One-Number Service (ONS) a UC application forwards all of the user's calls to his preferred device. The user decides which terminal (telephone) he wants to use for his communication (such as an office phone, mobile phone, phone in the internal/external company network, private phone, conference room, phone in a public place, CCS client).

Unified Communication (UC) involves the integration of communication media such as voice, video, screen sharing, messaging, chat, and file sharing in a uniform application environment, making collaborative work easy and trouble-free.

Unified Communications (UC) solutions are distinguished in that a UC user (hereinafter also designated as a user) can be reached via various communication media (generally called devices in this field). Depending on the situation, he may want to establish whether and via which media or devices he wishes to be reached. A significant class of devices comprises telephones (land-line and mobile). A UC user generally has several such devices. From the point of view of the communication system, some of these devices are switched in externally through gateways and can be included in the communication system as virtual devices.

The UC feature "One-Number Service" (also abbreviated as ONS) is especially significant because it hides the UC user's exact location and the actual device he is using from his communication partners. The issue therefore arises of how the following can be achieved:
  assigning UC users to the devices assigned to them,
  dynamically changing the assignment of devices (for external devices in particular),
  activating/deactivating the active device(s), and
  simultaneously hiding the complexity of these assignments from the applications,
  in order to keep the overall implementation expenditure low.

In the context of the present invention, the following practical examples (also called Use Cases) are cited:

The following devices, for which One-Number Service is to be provided, are assigned to a UC user:
  system telephone, connected directly to the communication system
  mobile telephone, externally switched through a gateway to the communication system,
  home office telephone, externally switched through a gateway to the communication system.
  CCS client, a client assigned via a cloud communication server Depending upon the location or situation, the UC user may wish to be called:
  If he is in the office: on the system phone and the mobile phone (because he is not always at his desk), but not on the home office phone.
  If he is in the home office: Only on the home office phone.
  If he is traveling: Only on the mobile phone (office hours), otherwise redirected to voice mail. In certain situations, however, the mobile number should not be called as an external device, but instead an alternative external phone number (e.g., a hotel).

The prior art offers solutions to this, but they do not meet all of the requirements listed above and are very complex to execute:

Utility model DE 20 2011 003 225 U1 and patent application WO 2014/060008 A1 describe the possibility of managing a virtual terminal for a participant or a group of participants. In this case, for example, the user of a telephone system has a mobile phone (with GSM and WLAN connections, if applicable). This mobile phone is currently not included in the system-specific communication scenarios. The user, for example, cannot forward conversations on the mobile phone to other participants in the communication system or accept conversations from another participant in the communication system. For this case, DE 20 2011 003 225 U1 and WO 2014/060008 A1 offer a remedy fully integrated into the communication system, for which no additional hardware is needed. Calls to and from the mobile phone are fully associated through an internal (virtual) participant in the communication system.

The procedure implemented by Unify to provide the One-Number Service using a UC application is based primarily on a definition described in ECMA-269, in which the user's device consists of a logical and a physical component. The logical component is the One-Number Service number and the physical component is the preferred device. In most cases, the One-Number Service number is the same as the user's desk phone. The user uses the preferred device to make calls under his One-Number Service number such that the connection number of the preferred device remains hidden from the conversation partner. Instead, the conversation partner always sees a connection to the One-Number Service number.

However, the One-Number Service according to DE 20 2011 003 225 U1 and WO 2014/060008 A1 is complex and expensive to implement. This also involves, in particular, the expense to the client-side application software, because any changes in assignments of active (preferred) devices must be processed actively by each client software. The approach presented here should significantly reduce this complexity. Connection of an external device in the communication system and of One-Number Service should be dynamic, but transparent to the client-side application software. If the assigned phone number is temporarily changed (e.g., hotel scenario), this has no effect on the application software and in particular no effect on the control or monitoring of the corresponding virtual devices.

In addition, the concept according to DE 20 2011 003 225 U1 and WO 2014/060008 A1 has limitations with respect to flexibility: This known version does not allow multiple terminals—as a subset of all devices assigned to the user— to be used simultaneously as preferred devices.

WO 2007/000447 A1 discloses a system for signaling switching statuses between a team module MULAP in a communication unit, to which multiple terminals E1 . . . En for a participant T are assigned, and a ComAss communication module that controls switching of the team module MULAP, wherein the switching statuses of the terminals E1 . . . E3 for the participant T are captured in the team module MULAP. The system is distinguished in that, in the team module MULAP and in the communication module ComAss, a logical terminal LE is assigned to the terminals E1 . . . En of a participant T, in that the switching status v of the participant T is determined from the captured switching statuses of the terminals E1 . . . E3 and entered into the logical terminal LE of the team module MULAP, and in that the switching status v of the participant T entered into the logical terminal LE is signaled to the communication module ComAss.

Under WO 2007/000447 A1, the team configuration of a participant T is developed using that participant's statically configured terminals E1, E2, E3 through two static CTI layers, as shown in FIG. 3.

CTI layer 2 shows the static link between the participant T and the respective linked terminal E1, E2, or E3. This is used today within OSBiz by the following applications:

Middleware components: CSTA Service Provider—CSP

Direct Station Select Server (app for cross-node LED signaling of participant statuses)—DSS Embedded UC-Server—LAS CTI layer 1 projects or condenses, for high-level applications, the status of the used terminal E1, E2 or E3 to the status of the static participant T. This allows the terminal with varying use to be selected from a static configuration. The participant T is therefore, in a mathematical sense, a function of the used terminal E1, E2, or E3.

$T=f(E1,E2,E3)$–finite list

This is used today within OSBiz by the following applications:

UC Server—"UC Suite"

This process assumes a static assignment of the participant T to his used terminals E1, E2, or E3 (because, for example, the terminal E3 can be used in multiple teams, an E3 change in runtime would require that all affected monitor points be updated in all applications, which is very involved and complex).

With One-Number Service (ONS), a participant T dynamically selects his desk phone E1 or his Circuit Client E2 (CCS client) or any preferred device OND 1, OND 2. In Circuit, this involves the cloud communication server from the company Unify. The the participant T uses the dynamically selected terminal to make calls under his One-Number Service number such that the connection number of the respective preferred device remains hidden from the conversation partner. Instead, the conversation partner always sees a connection to the One-Number Service number. This CSTA model according to One-Number Service is shown in FIG. 4. The CTI layer used for this adjusts itself to the respective selected preferred device and dynamically displays the link between the participant T and the respective terminal E1, E2, OND 1, or OND 2. The participant T is therefore, in a mathematical sense, a function of the used preferred device.

$T=f(\text{Preferred Device})$–infinite list

This is used today, for example, by many applications.

This process assumes a dynamic assignment of the participant T to his used terminals or preferred devices E1, E2, OND 1, or OND 2. The applications must follow the dynamic change.

SUMMARY OF THE INVENTION

The goal of this invention is to provide a simplified method for integrating a communication terminal as the preferred device in a static configuration, a corresponding computer program (product) for implementing the method, a machine-readable data carrier with the computer program product stored on it, and a corresponding communication system.

This objective is achieved with a method for integrating a communication terminal as the preferred device in a static configuration as in claim 1, a computer program product for implementing the method a machine-readable data carrier with a computer program product stored on it, and a corresponding communication system.

Additional advantageous embodiments of the invention are the subject matter of the dependent claims.

This invention allows the physical and virtual devices assigned to the UC user to be bundled in an advantageous group configuration (Group/MULAP), wherein each device can be switched individually between active and inactive, so that multiple preferred devices can be used at the same time (as a subset of all devices), if needed.

Overview of the invention from a UC application point of view:

In unified communication solutions, the role of the UC user is generally dissociated from individual communication terminals. This makes it possible to use a variety of communication media (e-mail, messaging, telephone) and to use multiple devices of the same type (e.g., multiple telephones) flexibly, if needed. It hides the multiple used devices from the communication partner (hence the name One-Number Service).

With this invention, the telephone number of a group assigned personally to the user that has certain characteristics (e.g., per the prior art: Multiple Line Appearance=MULAP) serves as the telephone number for the One-Number Service. The group/MULAP can contain multiple physical and virtual devices. Dynamic changes to telephone numbers assigned to virtual devices are used to flexibly link alternative (including external) devices such that they are transparent to the client-side UC applications, without the UC applications having to react (e.g., by changing their device monitoring, etc.). Instead of being restricted to a single preferred device, the UC application can switch each individual device in the group/MULAP between active and inactive using a suitable interface with the communication system, thereby creating subsets of multiple devices that are active as preferred devices at a particular point in time.

The selection of the preferred device(s) is preferably made from the UC application. If the user uses multiple UC clients (e.g., desktop and mobile), then any client can be used to change the preferred device(s) or the dynamic assignment of a virtual device to a telephone number (including external ones), without all clients having to react dynamically, e.g., by changing their monitoring.

In an additional preferred embodiment of the invented method, the preferred device is integrated and/or the preferred device is dynamically assigned by at least one first UC application, preferably without feedback, to the assigned configuration. This allows participant T to dynamically select his desk phone E1 or any preferred device OND 1, OND 2 and at the same time operate his high-level application without additional synchronization and without feedback. The CTI layer 3 defined here adjusts itself to the respective selected preferred device and dynamically indicates the link between the participant T and the respective preferred device E1, OND 1, or OND 2, while CTI layer 2 displays the link between the static (virtual) participant E2 and the respective dynamically linked preferred device. The CTI layer 1 then condenses, for high-level applications, the status of the used terminal E1, E2, OND 1, or OND 2 to the status of the static participant T, thereby allowing simultaneous operation of applications on the CTI layers 1-3 without feedback.

In another preferred embodiment of the invented method, the preferred device OND 1 is integrated and/or the preferred device OND 1, OND 2 is dynamically assigned, without feedback, to the application environment as a whole, which includes at least one second application software. This offers the advantage that a static assignment of the participant T to his used terminals E1 and E2 with simultaneous dynamic assignment of a preferred device makes it possible to change the runtime of the preferred device without updating all affected monitor points of all applications on the CTI layers 1-3.

In an additional preferred embodiment of the invented method, the preferred device OND 1 is integrated and/or the preferred device OND 1, OND 2 is dynamically assigned using Set and Get functions, in particular Set/Get forwarding, of an application software. This offers the advantage that the UC application can switch the virtual device(s) in the group/MULAP between active and inactive using Set and Get functions, in particular Set/Get forwarding, via a suitable interface with the communication system, thereby creating subsets of multiple devices that are active as preferred devices OND 1 and/or OND 2 at a particular point in time (see FIG. 14).

In another preferred embodiment of the invented method, the devices OND 1, OND 2 are activated and deactivated using Set and Get functions, in particular Set/GetAgentState, an application software, thereby creating any subsets of the already assigned static configuration. This offers the advantage that the UC application can switch one or more device(s) in the group/MULAP between active and inactive using Set and Get functions, in particular Set/GetAgentState, via a suitable interface with the communication system, thereby creating subsets of multiple devices that are active at a particular point in time (see FIG. 13).

In an additional preferred embodiment of the invented method, activating or deactivating a preferred device OND 1, OND 2 causes the automatic deactivation or activation of other assigned devices. This offers the advantage that the UC application can switch one or more device(s) in the group/MULAP between active and inactive using Set and Get functions, in particular Set/GetAgentState, via a suitable interface with the communication system, thereby automatically deactivating or activating one or more other devices in the group/MULAP.

In an additional preferred embodiment of the invented method, a preferred device OND 1, OND 2 is dynamically linked and activated or deactivated on a separate, preferably self-contained presentation level, which is configured in particular as a CTI layer corresponding to a virtual device. This offers the advantage that the preferred devices OND 1 and/or OND 2 are selected and subsets of multiple devices are created by means of activation or deactivation on a separate CTI layer 3 (see FIG. 9A and FIG. 12) and are independent of the CTI layers 1 and 2, which are transparent to the application.

This invention also includes a computer program that implements the invented method and a machine-readable data carrier suitable for storing this computer program.

Additional advantages, features, and characteristics of the present invention are presented in the following description of advantageous embodiments with reference to the drawings.

BRIEF DESCRIPTION OF THE DRAWINGS

FIGS. 8A, 8B and 8C are examples of applications for this invention, FIGS. 9A and 9B are tables that contain corresponding representations for UC-ONS applications or for CSTA applications.

FIG. 12 is a table that contains corresponding representation for UC-ONS applications.

DESCRIPTION OF THE PREFERRED EMBODIMENTS

Figure 5:
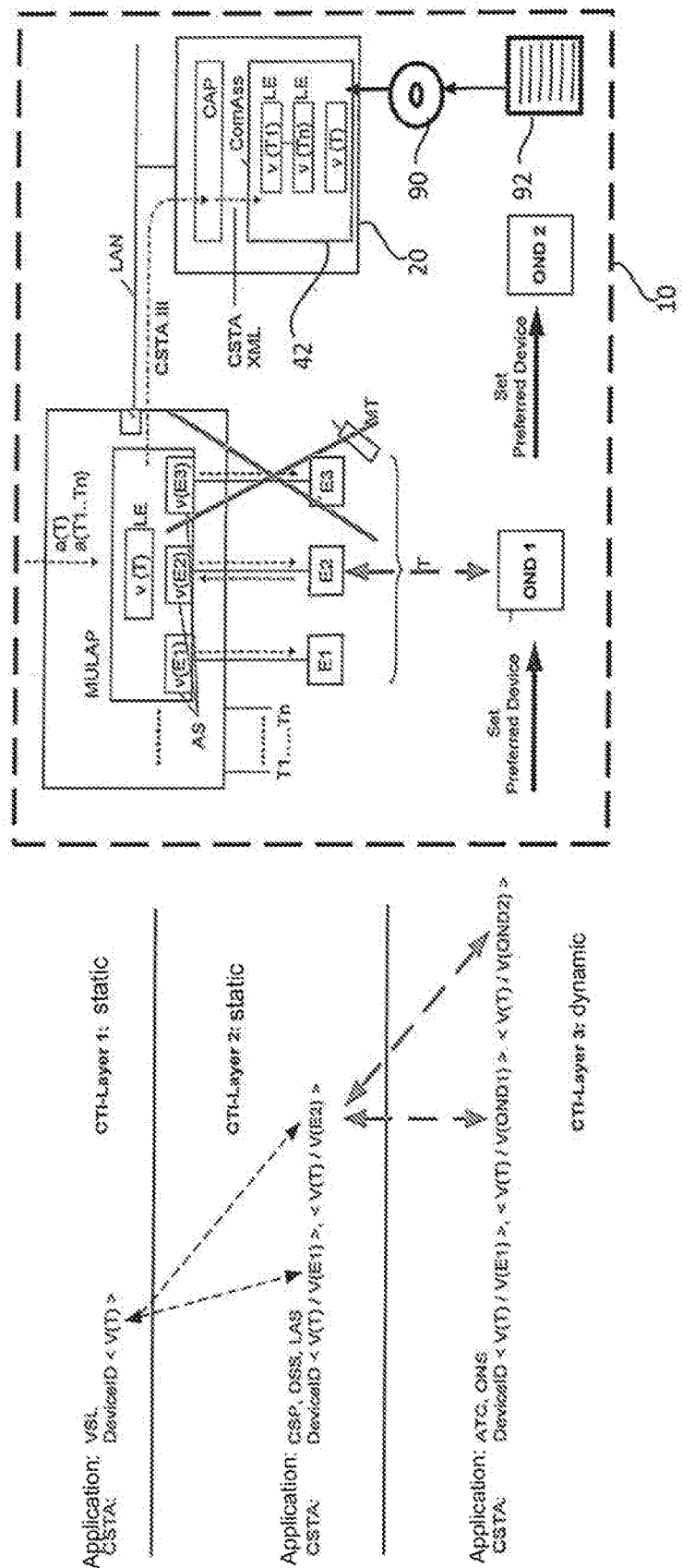
FIG. 5 is a schematic diagram showing an overview arrangement of a telecommunication system according to the invention.

FIG. 5 shows a first embodiment of a telecommunication system 10 in which the invented method is being carried out as described below. The telecommunication system 10 comprises terminals E1, E2, OND 1, and OND 2, as well as other terminals if applicable, assigned to a user T. It also includes a control device 42 in a server, which executes the method using a schematically represented computer program 92 (stored on a CD-ROM 90 as the example of a data carrier).

This method links the dynamic approach to the static approach. This step now allows participant T to advantageously select his dynamic desk phone E1 or any preferred device OND 1, OND 2 and at the same time operate his high-level application without additional synchronization and without feedback. This is represented in the CSTA model according to the invention as shown in FIG. 5.

The CTI layer 3 adjusts itself to the respective selected preferred device and dynamically displays the link between the participant T and the respective preferred device E1, E1, OND 1, or OND 2.

CTI layer 2 shows the link between the static (virtual) participant E2 and the respective dynamically linked preferred device. E2 is therefore, in a mathematical sense, a function of the preferred device.

$E2 = f(\text{Preferred Device}) - \text{infinite list}$

CTI layer 1 projects or condenses, for high-level applications, the status of the used terminal E1, E2, OND 1, or OND 2 to the status of the static participant T. The participant T is therefore, in a mathematical sense, a function with a finite list while at the same time having infinite content (preferred device).

$T = f(E1, E2 = f(\text{Preferred Device})) - \text{finite list "with infinite content"}$ The use of this method allows simultaneous operation of applications on the CTI layers 1-3 without feedback.

This method makes it possible to use a static assignment of the participant T to his used terminals E1 and E2 with simultaneous dynamic assignment of a preferred device. This approach makes it possible to change the runtime without having to update all affected monitoring points of all applications. In other words, for example, through an additional CTI layer, this method offers to prepare a previously static approach for a dynamic operational purpose.

In addition, projecting or condensing the terminals individually assigned to the participant T is not desirable as it is for VSL (classic high-level UC application); instead, the LAS (UC application with new preferred device approach) prefers direct access to the individual terminals.

Figure 1:
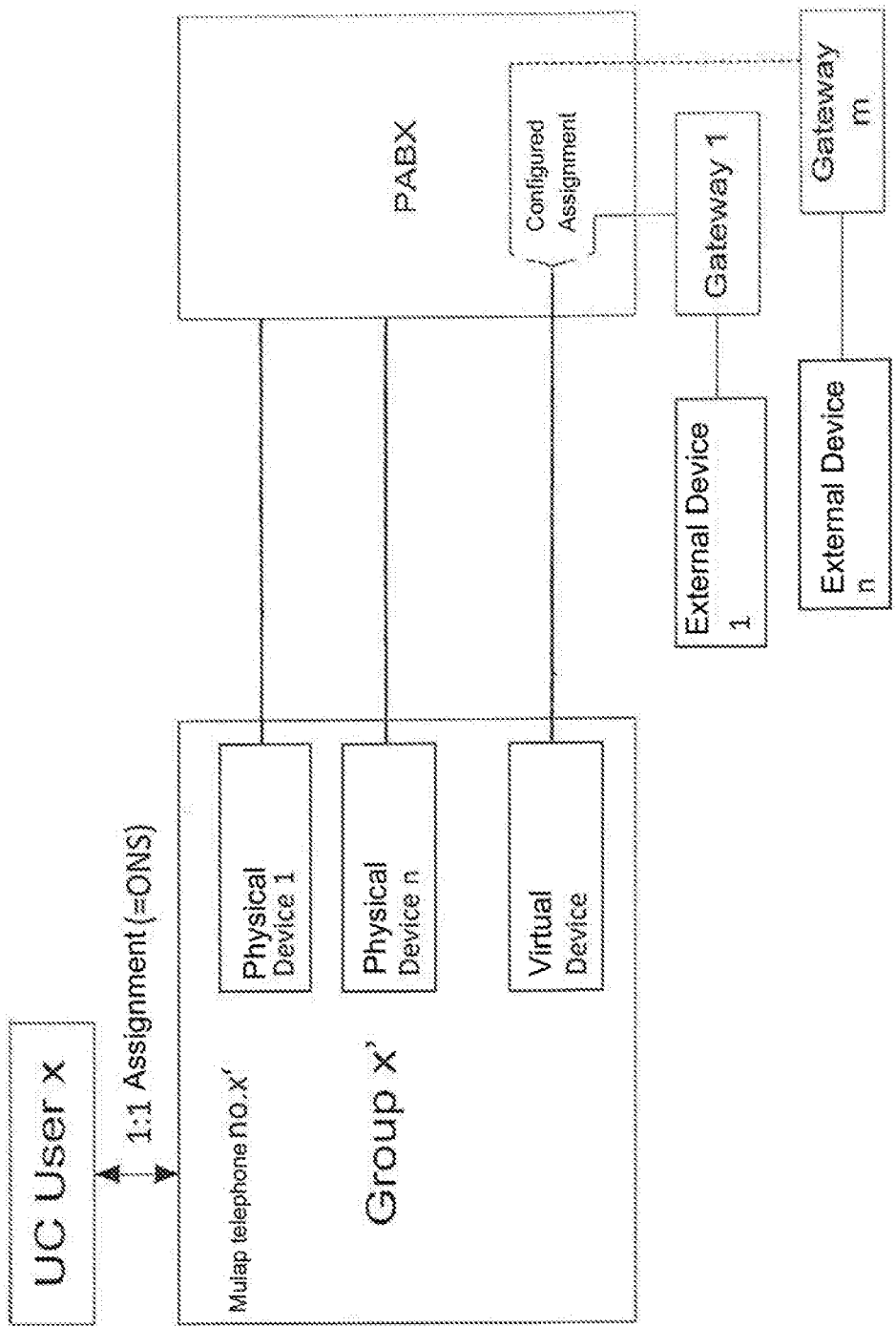
FIG. 1 is a first overview arrangement of a configuration according to the invention.
Figure 2:
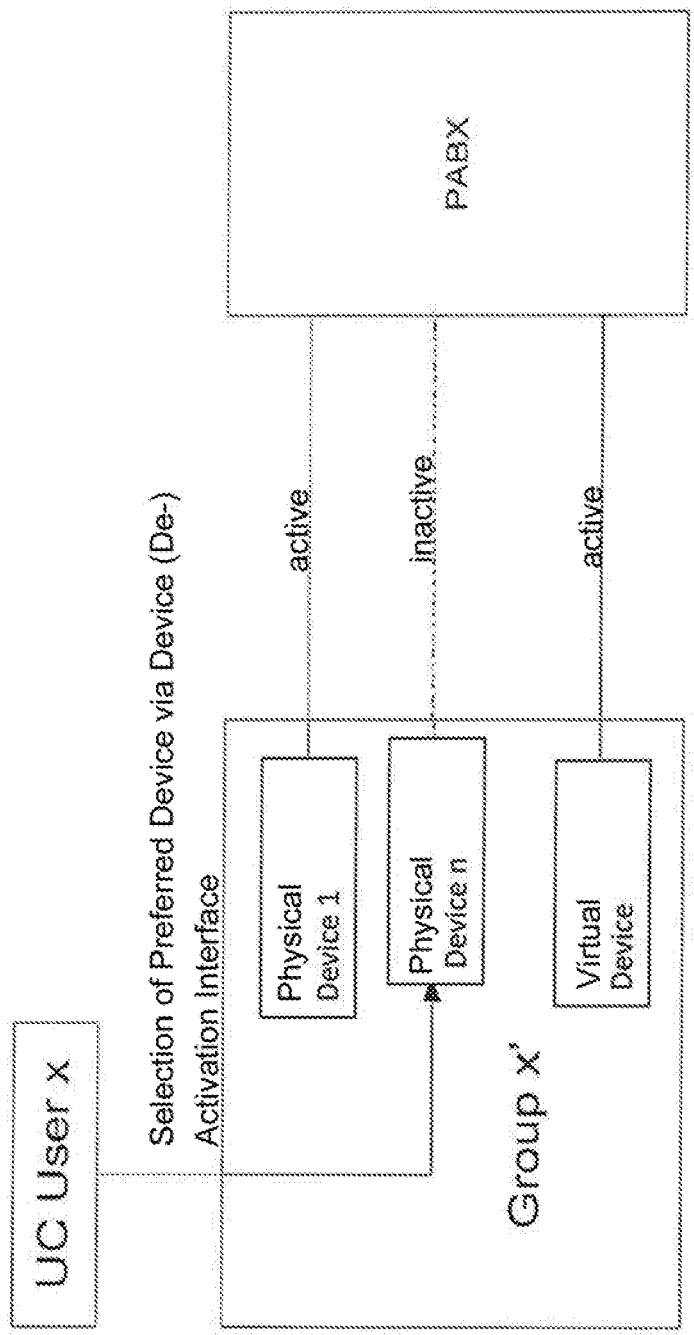
FIG. 2 is a schematic diagram second overview arrangement of a configuration according to the invention.
Figure 3:
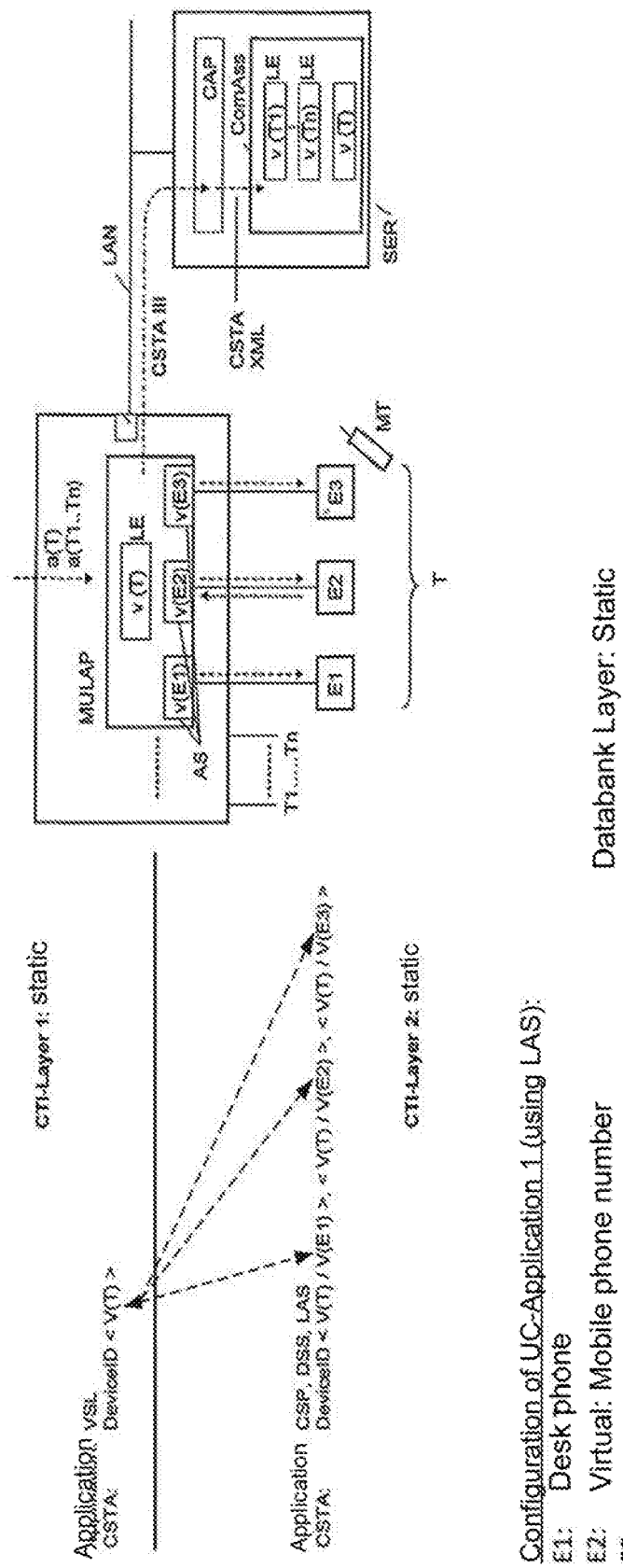
FIG. 3 is a schematic diagram showing an overview arrangement of a telecommunication system according to WO 2007/000447 A1.
Figure 4:
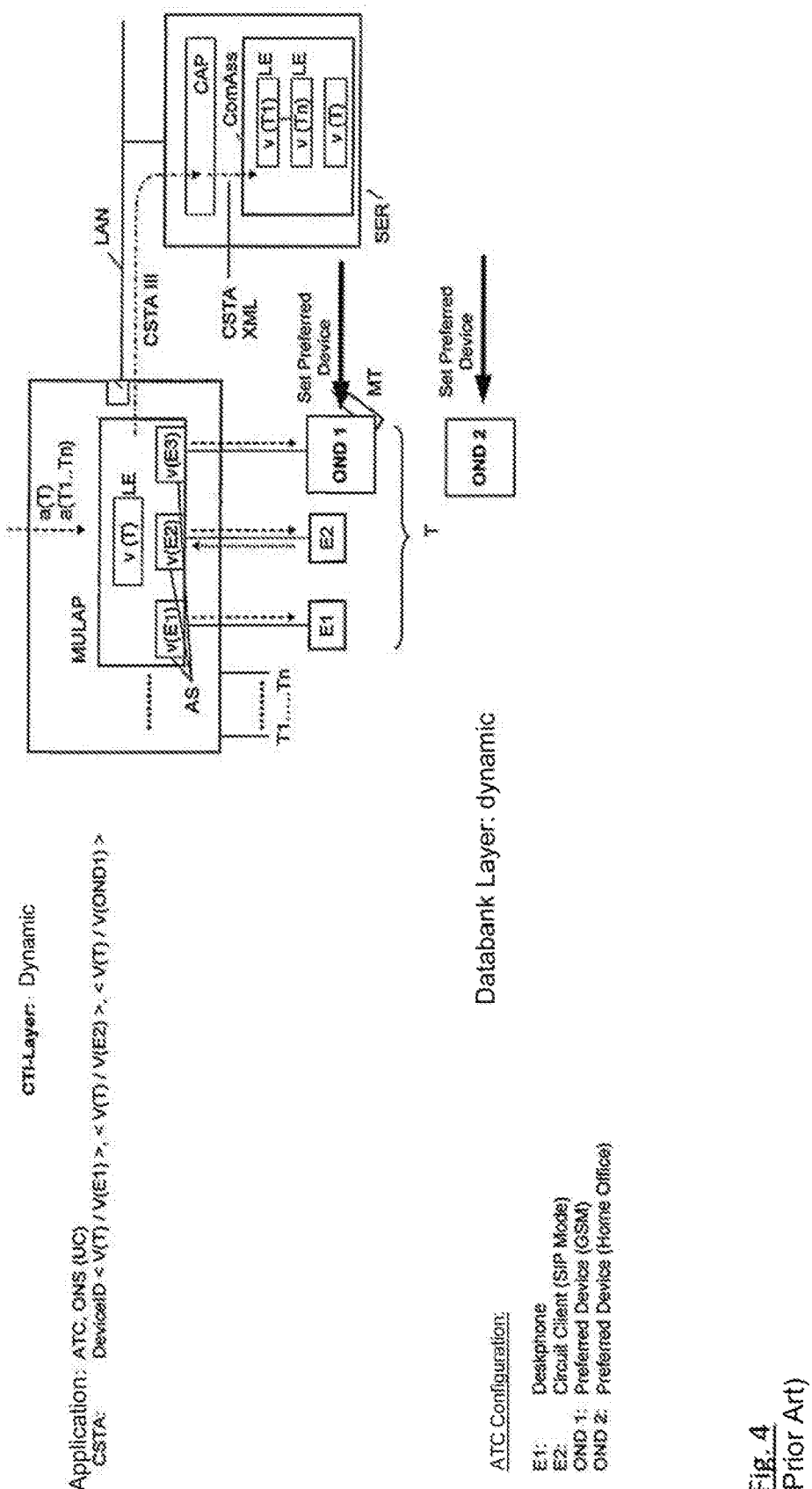
FIG. 4 is a schematic diagram showing an overview arrangement of a telecommunication system according to the One-Number Service.

The following FIGS. 1 and 2 should illustrate this model: FIG. 1 shows the structure of a UC user in a group of devices (group/MULAP) for the purpose of using the One-Number Service. Individual or multiple devices in the group/MULAP are activated or deactivated for the purpose of dynamically specifying one or more preferred devices using CSTA with the Set/AgentState command adapted for this application. If all devices in the group/MULAP are switched to active, this is synonymous with "no preferred device—all devices in the group are active." FIG. 2 shows the implementation of preferred device(s) with increased flexibility by creating subsets of active devices.

This method is represented from a CSTA point of view as follows:
The technical interface for controlling the communication system, in particular
  for implementing the simplified One-Number Service,
  for dynamic assignment of external telephone numbers to a virtual device, and
  for dynamic activation or deactivation of individual devices in a group/MULAP, is preferably established through CSTA as is common for communication systems.

Fulfilling the CSTA requirements for basic One-Number Service is extremely complex and very expensive to implement, for both the communications server and the client-side application software. As it progresses, this implementation must involve a complex test and a correspondingly complex service. In addition, its retro-compatibility with already existing applications, in particular already existing One-Number Services (e.g., CallMe and Mobility Entry in OSBiz) must be verified.

This present method offers a significantly simplified alternative to the very complex and therefore expensive solution of the previously known One-Number Service, using known configurations according to DE 20 2011 003 225 U1 and WO 2014/060008 A1.

This method is especially suitable for communication systems that currently have limited or no One-Number Service but do support the concept of group/MULAP groups.

As an example, the following uses OpenScape Business (OSBiz) with its corresponding UC applications. It shows how One-Number Service can be implemented easily, with expanded flexibility, and how the required testing and service expense can be significantly reduced. Here the changing preferred device is associated according to a One-Number Service for the applications by the virtual participant known from DE 202011 003 225 U1 and WO 2014/060008 A1.

In addition, this method allows for expanded flexibility, so that the user can use not only one exact device from the group of devices assigned to him, but also multiple preferred devices at the same time as needed.

According to DE 20 2011 003 225 U1, the external participant is represented within Call Processing initially by a Trunk Device. First, the authentication required for system integration takes place, and only authorized mobile telephones have this access. When authentication is completed, all additional actions of the external participant are linked (associated) with a participant's device within Call Processing. This allows for all types of all external participants (including mobile participants) to be mapped to one internal participant and managed accordingly.

The participating device used is a so-called virtual device, i.e., a device with no physical connection and therefore without additional hardware. The connection to physical items, i.e., to the various hardware types of mobile devices or communication terminals (GSM, WLAN, SIP Endpoint, SIP Provider, Legacy Trunk, and terminals, as well as WebRTC—see WO 2014/060008 A1) is established by means of association. The related signaling of features and sounds toward the trunk is directed by Call Processing via the associated virtual participant to the mobile device. Because the mobile participant is not reached via a fixed trunk device in the system, this association with the virtual device is always made on the existing connection and must be reestablished each time.

Figure 6:
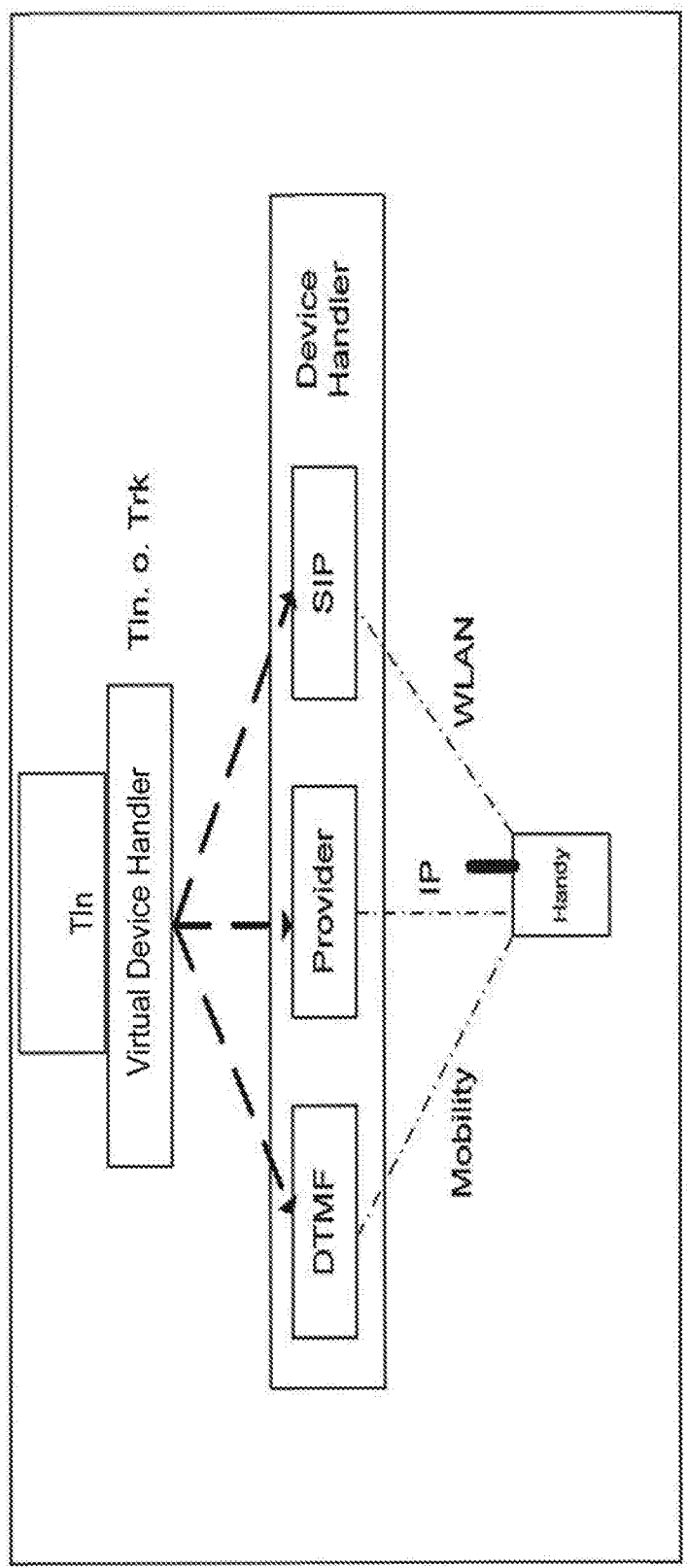
FIG. 6 is a schematic diagram showing an overview arrangement of a telecommunication system according to DE 20 2011 003 225 U1.
Figure 7:
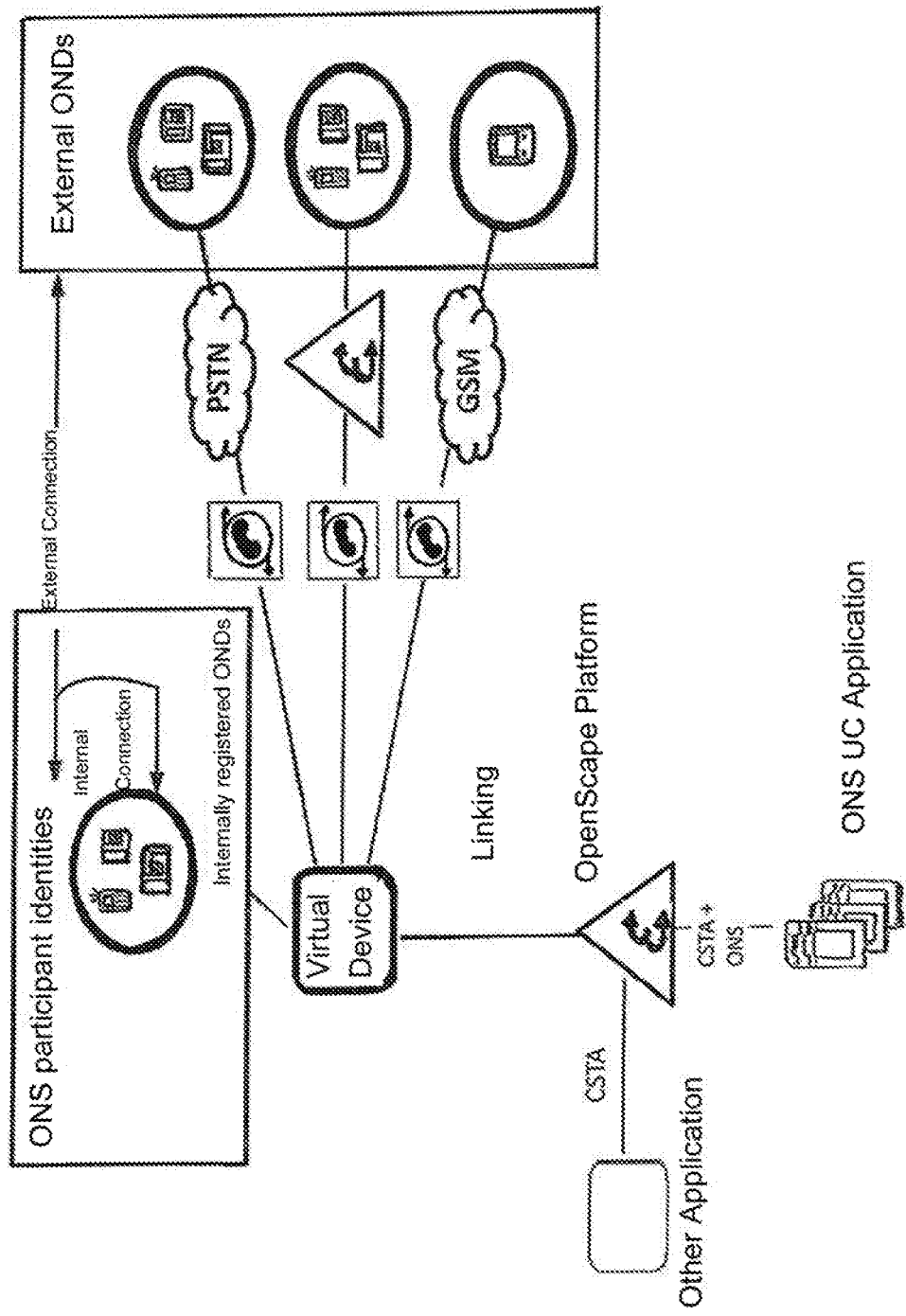
FIG. 7 is a schematic diagram showing another view of the invented telecommunication system.

With Unify, the preferred device is represented by the One-Number Service (ONS) used in the OpenScape Voice (OSV) communication platform with the UC application using CSTA, typically as shown in FIG. 6.

This links the preferred device to the virtual device according to the invention. All additional actions of the preferred device are always associated with the same virtual device within Call Processing. Using the CSTA service Call Forwarding (labeled as step (a)) according to the invention (and expanded with additional features), the user now sets the respective preferred device temporarily and links it with the virtual device. Involved applications synchronize themselves with the respective current preferred device, using the CSTA service Call Forwarding. The respective preferred device remains hidden from all other applications. Retro-compatibility is provided. In addition, not only external mobile participants, but also internal participants are linked in.

Figure 13:
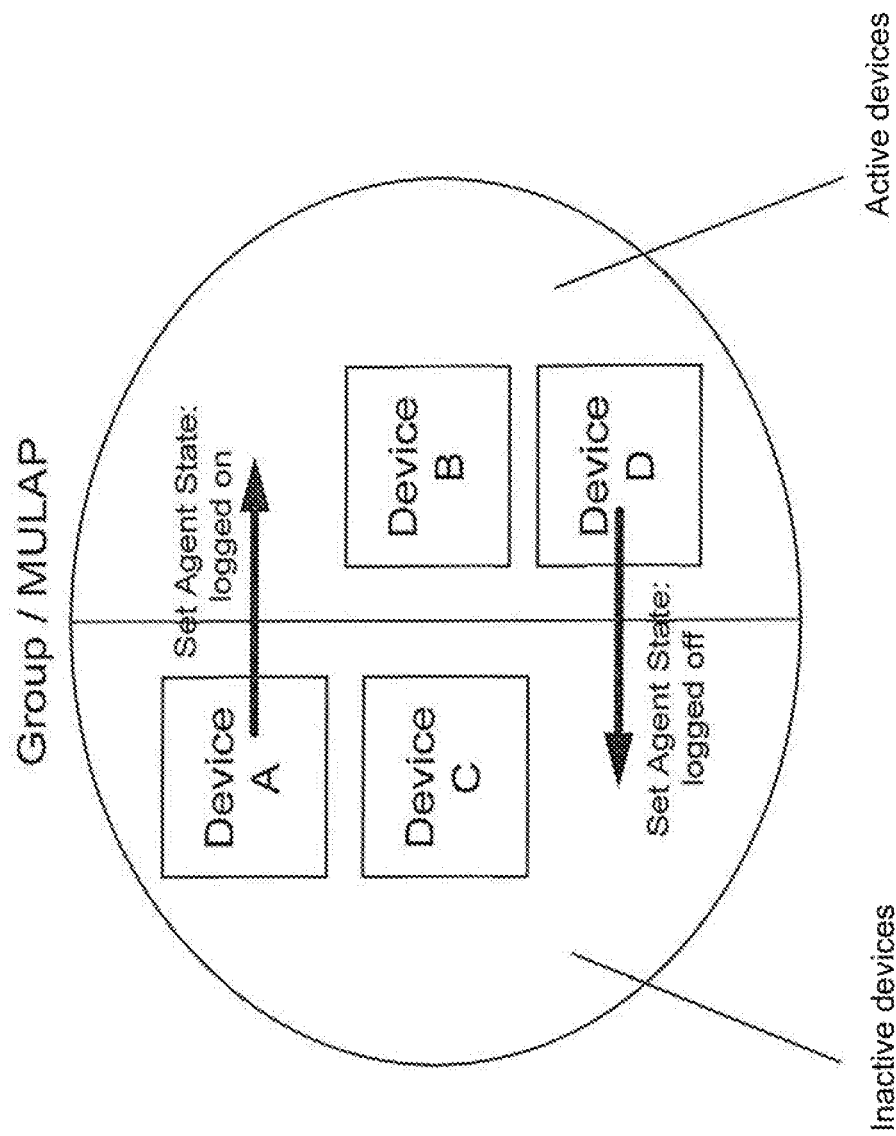
FIG. 13 is a schematic representation of a group configuration with one group or MULAP per user for his internal devices, wherein the active devices within the group/MULAP are selected by switching the group and MULAP members in and out.
Figure 14:
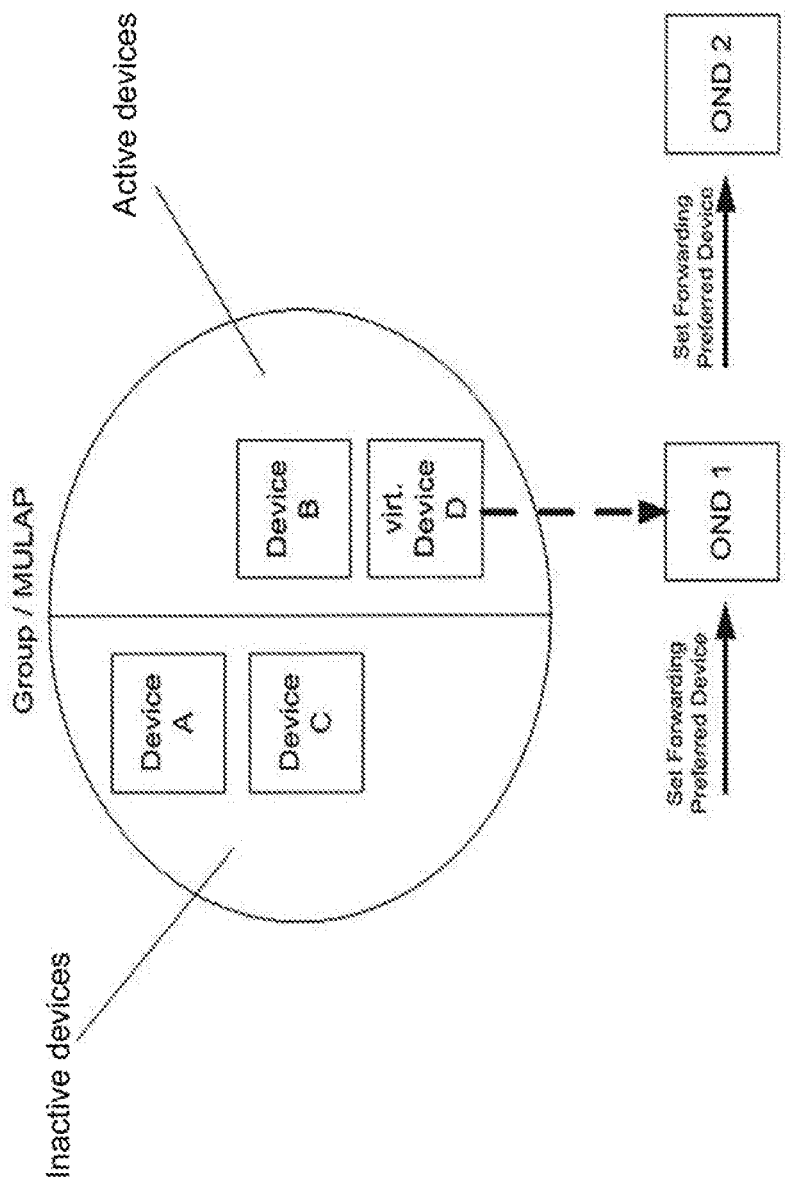
FIG. 14 is a schematic representation of a group configuration with one group or MULAP per user for his internal devices and multiple virtual devices representing external ONDs belonging to the user.

An expanded approach by means of group generation is possible, as shown in FIGS. 13 and 14. This approach involves:

Creation of one group or MULAP per user for his internal devices and one or more virtual devices representing external ONDs belonging to the user.

A subset of devices being selected from the group/MULAP, which being preferred for incoming calls (=active).

The active (preferred) devices within the group/MULAP beings elected by switching groups and MULAP participants in and out with proprietary use of the CSTA Set Agent State service (indicated as step (b)).

The first two steps (a) and (b) allow a simplified individual configuration of the preferred device with simultaneous individual selection of the call targets.

Advantages of this expanded approach are:

Expanded flexibility: Not just one, but multiple preferred devices can be designated.

The special case of "no preferred device" is easy to generate, with all devices set as logged on or available.

For outgoing calls, regardless of the number of active devices, a "controlling device" can be designated individually by application instance.

Group-specific features of the OpenScape system can be used, e.g., call forwarding rules within the group (similar to an AutoPilot function in OpenScape UC/Circuit, for example).

Different examples of applications for this method are shown in FIGS. 8-12. The lower-case letters used in the connections in FIGS. 8 and 10 have the following meanings:

c: "connected" using switching,
a: "alerting" (ringing) using switching.

The circled designations "C1" and "C2" stand for "Call1" or "Call2." The devices marked with a letter "V" are virtual devices, and the devices marked with a letter "N" are network devices.

The selections of CSTA services and parameters used are for example only. The same effect can also be achieved using other CSTA parameters.

FIGS. 8A, 8B and 8C show the preferred device setup (corresponding to Step a). A user 2 changes his preferred device to the desk phone D2, to an external device D5 (e.g., GSM), or to an internal device D6 (e.g., conference room). User 1 calls User 2.

FIG. 9A shows a corresponding representation for UC-ONS applications, while FIG. 9B shows a corresponding representation for CSTA applications. The representation for CSTA applications is then preferably via the desk phone device D2 or the virtual device V3.

Figure 10C:
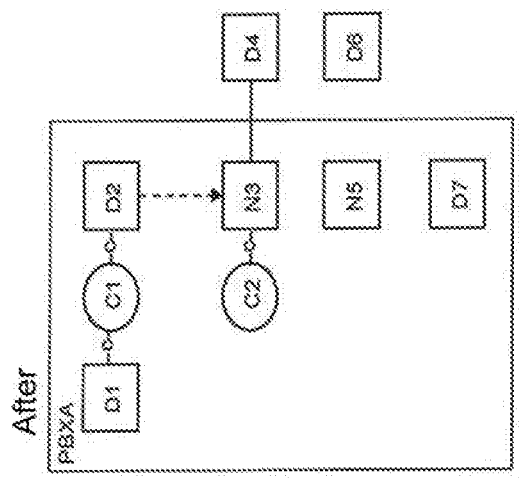
FIGS. 10A, 10B, 10C, 11A, 11B and 11C are additional examples of applications for this invention.
Figure 10B:
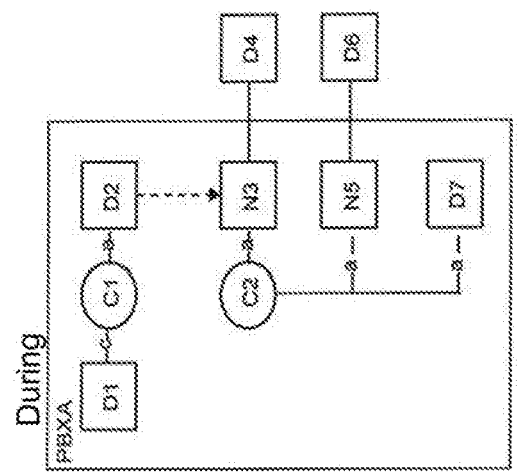
Figure 10A:
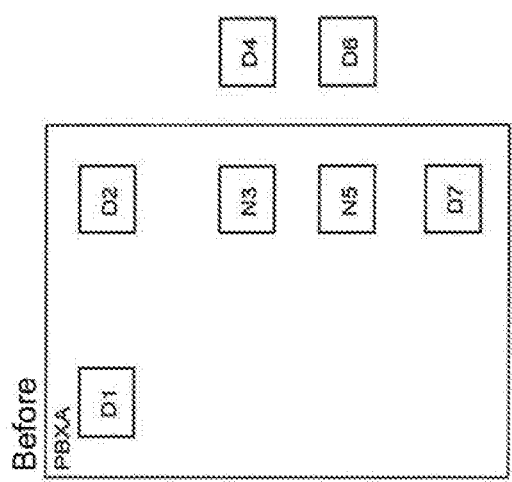

FIGS. 10A, 10B and 10C show the preferred device selection (corresponding to Step b). User 1 calls User 2.

A User 2 has a group or MULAP with corresponding preferred devices. Signaling takes place as shown in FIGS. 10A, 10B and 10C, with the status before the call shown in FIG. 10A, the status while the call is being connected shown in FIG. 10B, and the status after successful connection of the call shown in FIG. 10C.

Figure 11C:
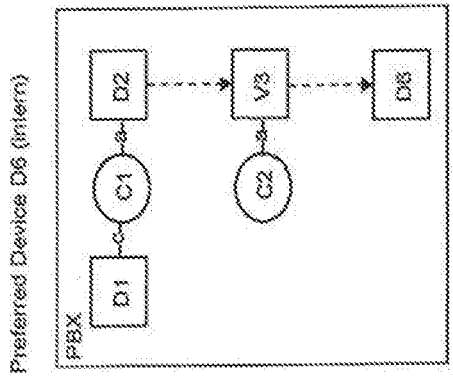
Figure 11B:
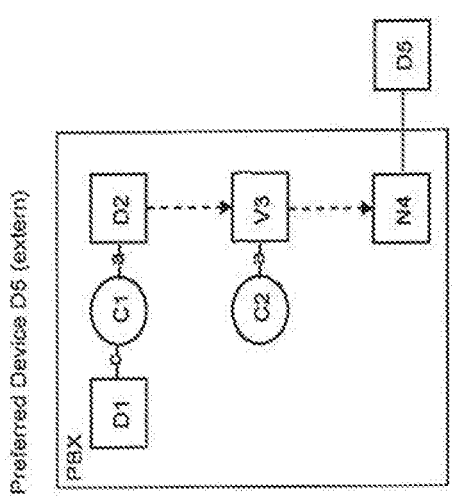
Figure 11A:
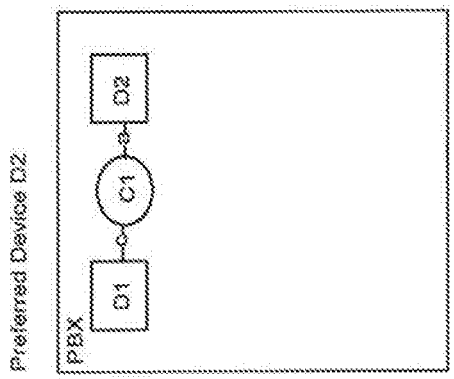

If the selection of the preferred device is changed from the desk phone D2 to an external device D5 (e.g., GSM) and to an internal device D6 (e.g., conference room), the signaling is simplified as shown in FIGS. 11A, 11B and 11C. User 1 calls User 2 again.

FIG. 12 shows a corresponding representation for UC-ONS applications. The exclusive switching in or out means the same here. The representation for CSTA applications is the same as in FIG. 9B.

Note that the same linking or assignment mechanisms apply to MULAP, GSM only, and the dual-mode mobility configuration.

It should be understood that, with this invention, there is a correlation between features described with respect to method steps and features described with respect to corresponding equipment. In this regard, described method features are to be considered as equipment features that are part of the invention—and vice versa—even when this is not explicitly stated.

It should be noted that the features of the invention described by referencing the presented embodiments, for example the type and configuration of individual components and terminals of the communication system, individual messages, signals, and parameters, can also be present in other embodiments, unless stated otherwise or prohibited for technical reasons. Not all features of individual embodiments described in combination must necessarily always be implemented in any one particular embodiment.

The invention claimed is:

1. A communication system for integrating at least one first communication terminal assigned to a user as a preferred device in a static configuration of the communication system and/or for dynamically switching from a first communication terminal used as a preferred device to a second communication terminal as a preferred device for providing a one-number service using the preferred device, to which a one-number service number is assigned, comprising:

a first communication terminal;
a second communication terminal;

a control device communicatively connected to the first communication terminal and the second communication terminal;

the control device configured to statically assign the first communication terminal to a user to provide a one number service and statically assign the second communication terminal to the user to provide the one number service;

the control device configured to dynamically assign at least one third communication terminal to at least one virtual device to associate the at least one third communication terminal with the user for the one number service so that the dynamic assignment of the at least one third communication terminal occurs without feedback and without updating all affected monitor points of all applications associated with the one number service; and wherein the dynamic assignment of the at least one third communication terminal to the at least one virtual device is performable so that the at least one third communication terminal is dynamically assignable as a preferred device for the one number service in response to user input assigning the third communication terminal as the preferred device without device monitoring for the one number service having to be changed and without updating all affected monitor points of all applications associated with the one number service.

2. The communication system of claim 1, wherein the control device is configured so that a call directed to the user via the one number service is alerted at the first communication terminal, the second communication terminal, and that least one third communication terminal via a first Computer Telephony Integration (CTI) layer, a second CTI layer, and a CTI layer.

3. The communication system of claim 2, comprising:

the at least one third communication terminal connected to the control device, the control device associating the at least one third communication terminal with the user via the at least one virtual device of the third CTI layer, the at least one third communication terminal comprising a device that is external to a network that includes the control device, the first communication terminal and the second communication terminal.

4. The communication system of claim 1, wherein the control device is configured to dynamically remove the at least one third communication terminal as a preferred device for the one number service in response to determining that the at least one third communication terminal is inactive and assign a fourth communication terminal that is active to the at least one virtual device as a preferred device without device monitoring for the one number service having to be changed.

* * * * *